United States Patent
Chen et al.

(10) Patent No.: US 9,021,002 B2
(45) Date of Patent: Apr. 28, 2015

(54) PHASE-TO-AMPLITUDE CONVERTER FOR DIRECT DIGITAL SYNTHESIZER (DDS) WITH REDUCED AND AND RECONSTRUCTED ADD LOGIC ARRAYS

(71) Applicant: Hong Kong Applied Science & Technology Research Institute Company Limited, Hong Kong (HK)

(72) Inventors: Zhongzi Chen, Hong Kong (HK); Beiping Yan, Hong Kong (HK); Xiao Huo, Hong Kong (HK); Xiaowu Cai, Shenzhen (CN)

(73) Assignee: Hong Kong Applied Science & Technology Research Institute Company, Limited, Hong Kong (HK)

( * ) Notice: Subject to any disclaimer, the term of this patent is extended or adjusted under 35 U.S.C. 154(b) by 345 days.

(21) Appl. No.: 13/760,012

(22) Filed: Feb. 5, 2013

(65) Prior Publication Data
US 2014/0222882 A1 Aug. 7, 2014

(51) Int. Cl.
*G06F 1/02* (2006.01)
*G06F 1/03* (2006.01)

(52) U.S. Cl.
CPC .................................. *G06F 1/0321* (2013.01)

(58) Field of Classification Search
None
See application file for complete search history.

(56) References Cited

U.S. PATENT DOCUMENTS

| 4,130,876 A * | 12/1978 | Mitsuhashi | 708/276 |
|---|---|---|---|
| 4,806,881 A * | 2/1989 | Ives et al. | 332/108 |
| 4,809,205 A | 2/1989 | Freeman | |
| 4,905,177 A | 2/1990 | Weaver, Jr. et al. | |
| 5,321,642 A | 6/1994 | Goldberg | |
| 5,999,581 A | 12/1999 | Bellaouar et al. | |
| 6,032,028 A * | 2/2000 | Dickey et al. | 455/110 |
| 6,976,043 B2 * | 12/2005 | Clifton | 708/277 |
| 7,440,987 B1 | 10/2008 | Song et al. | |
| 7,509,363 B2 * | 3/2009 | Clifton | 708/277 |
| 2014/0222882 A1 * | 8/2014 | Chen et al. | 708/271 |

OTHER PUBLICATIONS

Sunderland, David A. "CMOS/SOS Frequency Synthesizer LSI Circuit for Spread Spectrum Communications", JSSC vol. 19, No. 4, Aug. 1984, pp. 407-506.

Nicholas, Henry T.. "A 150-MHz Direct Digital Frequency Synthesizer in 1.25 um CMOS with -90dBc Spurious Performance", JSSC vol. 26, No. 12, 1991, pp. 1959-1969.

* cited by examiner

*Primary Examiner* — David H Malzahn
(74) *Attorney, Agent, or Firm* — gPatent LLC; Stuart T. Auvinen

(57) ABSTRACT

A sine wave generator for a Direct Digital Synthesizer (DDS) converts a digital phase input into a digital sine wave output. Sine values and slopes are stored in read-only memory (ROM) for coarse upper phase bits in a first quadrant. A quadrant folder and phase splitter reflects and inverts values from the first quadrant to generate amplitudes for all four quadrants. Each sine value and slope is stored for a range of lower phase bits. A Delta bit separates upper and lower phase bits. Delta conditionally inverts the lower phase bits, the sine value, and the final polarity. A reduced AND logic array multiplies the slope by the conditionally inverted lower phase bits. A reconstructed ADD logic array then adds the conditionally inverted sine value. The conditionally inverted polarity is added to generate the final sine value. Sine generation logic is streamlined with conditional inversion based on the Delta bit.

21 Claims, 7 Drawing Sheets

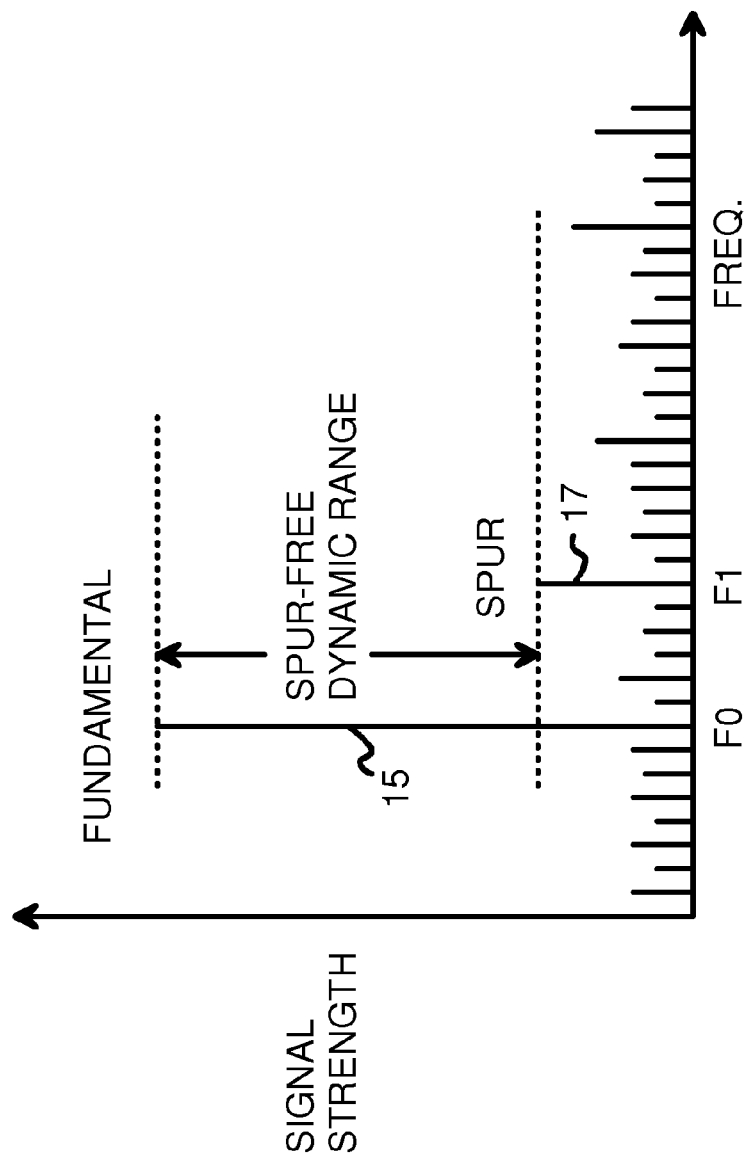

PHASE-TO-AMPLITUDE CONVERTER FOR DIRECT DIGITAL SYNTHESIZER (DDS) WITH REDUCED AND AND RECONSTRUCTED ADD LOGIC ARRAYS

FIELD OF THE INVENTION

This invention relates to digital synthesizers, and more particularly for sine-wave generator circuits.

BACKGROUND OF THE INVENTION

Direct Digital Synthesizers (DDS) are used to create sine waves and derivative waves that are needed for Automated-Test-Equipment (ATE), software-defined radio, medical imaging, radar systems, and other applications. While sine waves are a part of the natural world and thus are common in analog systems, digital systems rely on 1's and 0' and do not have fundamental physical properties that cause sine waves to be generated. Thus generating an approximation of a sine wave is more problematic in digital systems.

FIG. 1 shows a prior art Direct Digital Synthesizer (DDS) system. A frequency control word K may represent a phase and is accumulated by adder 12 in phase accumulator 10. The accumulated phase is input to converter 14, which converts the accumulated phase to a sine wave. Since DDS core is a digital system, the accumulated phase and sine wave are digital values, not continuous voltages. Digital-to-Analog Converter (DAC) 16 converts the digital value that represents the sine wave to and analog voltage or current. Since DDS core 18 has discrete steps in the digital values, the final analog waveform shows steps in voltage, although these can be reduced by an analog filter such as a capacitor on the output of DAC 16, or by reducing the step size of the digital values in DDS core 18, such as by increasing the number of digital bits.

Converter 14 may be a digital circuit that uses an approximation of the sine wave function. For example, a read-only memory (ROM) may store amplitude values of the sine wave function for a range of phase input values. However, the size of the ROM may be excessive, so more complex functions may be used to approximate the amplitude of the sine wave using fewer entries in the ROM. The digital phase input may be broken into several component parts and partial sine and cosine functions of the component parts are generated and multiplied and added together. Even more complex functions such as Taylor series have been used. Additional adders, subtractors, multipliers, and their control logic can make these implementations expensive and slow the system.

The compression ratio is the ratio of the size of an ideal ROM of the DDS to the size of entries in all ROMs that this architecture uses, for the same phase and amplitude resolution.

The difference in signal strength between a fundamental and a spur in a spectrum graph of the sine wave generator is the Spur-Free Dynamic Range (SFDR). A larger SFDR is important for better high-speed performance of the DAC and other components.

Larger spurs often occur at harmonics of the fundamental frequency, especially the second and third order harmonics. It is desirable to increase SFDR.

What is desired is a DDS sine wave generator that does not require a huge ROM and many digital bits in the phase input. A digital sine wave generator with a good compression ratio and SFDR is desired. A digital synthesizer with a sine wave generator that is not too complex to operate at a high speed is desirable.

BRIEF DESCRIPTION OF THE DRAWINGS

FIG. 8 is a graph of the spectral performance of the sine wave generator.

DETAILED DESCRIPTION

The present invention relates to an improvement in sine-wave generators. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that linear interpolation of a sine wave function can be modified to simplify the calculation and look-up logic. In particular, the inventors realize that a coarse sine function and slope adjustment may be calculated using ADD and AND arrays, and then adjusted when the phase is before the coarse phase value rather than after the coarse phase value. Simplified logic and reduced table sizes may allow for higher-speed operation.

Figure 1:
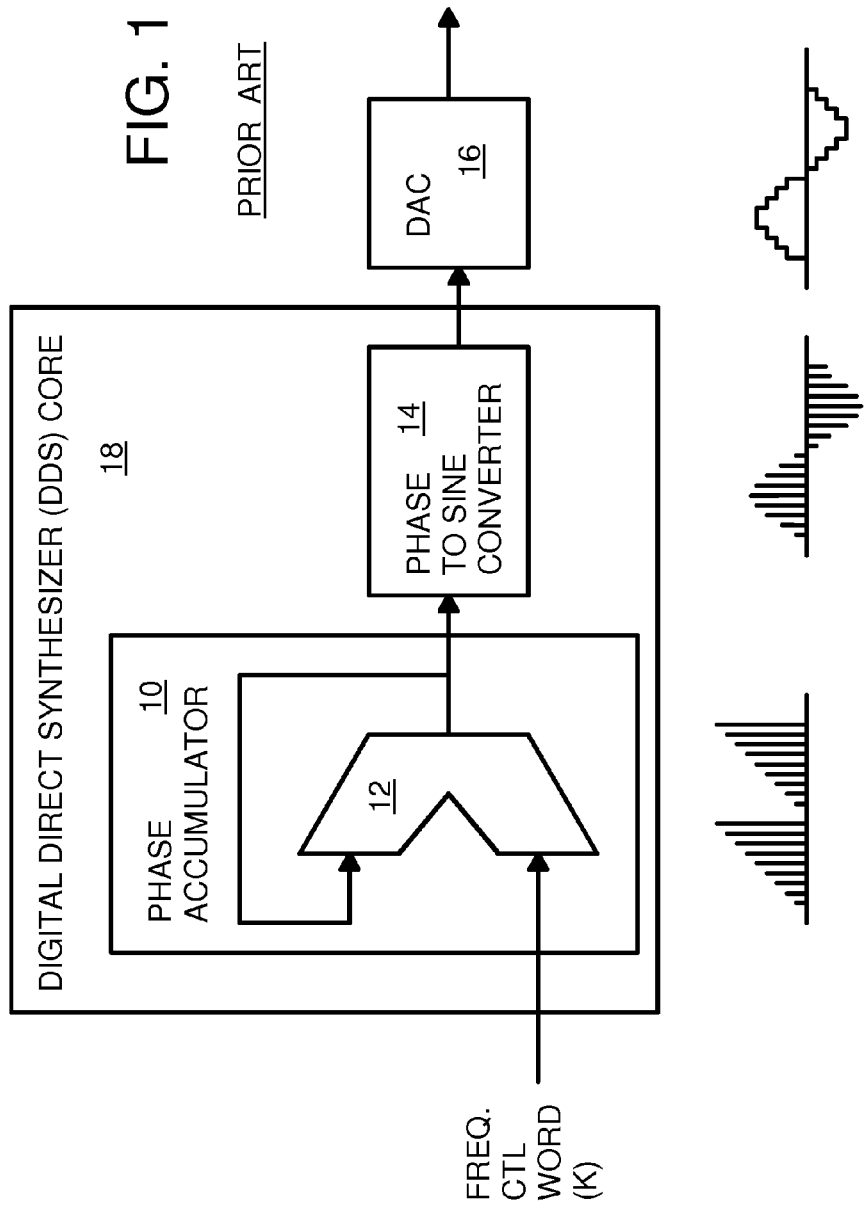
FIG. 1 shows a prior art Direct Digital Synthesizer (DDS) system.
Figure 2:
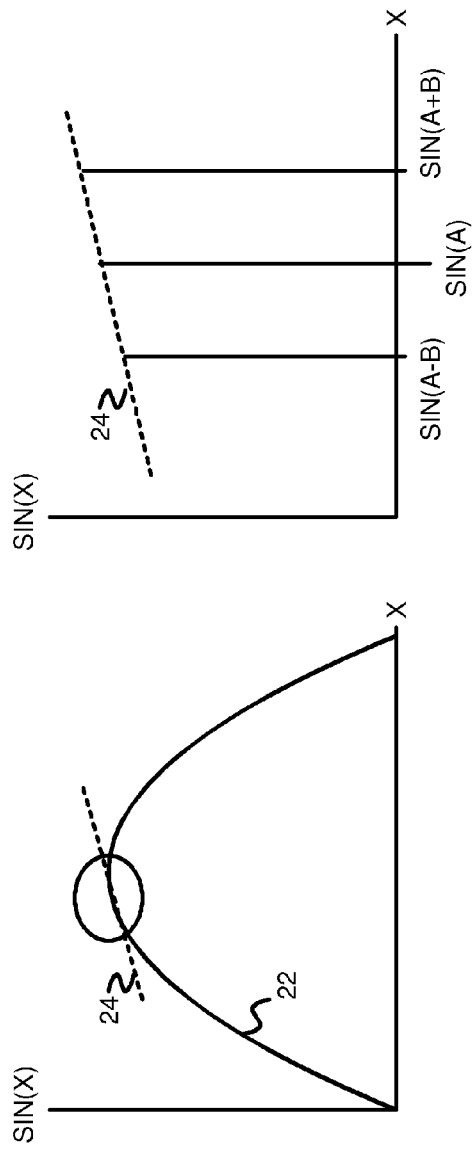
FIGS. 2A-C show graphs and equations for sine wave generation.

FIGS. 2A-C show graphs and equations for sine wave generation. In FIG. 2A, a sine wave function is shown. The x axis shows the phase input X, from zero to $\pi$, or 180 degrees, while the y axis shows the sine wave function, sin(X), or the amplitude of the sine wave.

Sine wave 22 rises from zero amplitude to a maximum amplitude at a phase angle of $\pi/2$, and then falls to zero amplitude at a phase input of $\pi$, or 180 degrees. The sine wave is inverted for the second half of the cycle, from $\pi$ to $2\pi$ (not shown). For any phase input value X, the sin(X) and slope 24 may be generated.

In FIG. 2B, a portion of the sine wave is enlarged. An center value sin(A) may be stored in a ROM or other table along with slope 24 at phase value A. The phase input may be slightly larger than A, such as A+B. The sine function for A+B may not be stored. Instead, sin(A+B) may be estimated using slope 24. Likewise, the sine function output may not be stored for sin(A−B), but may be estimated using the slope at phase input A.

FIG. 2C shows equations used to approximate the sine function. The value of sin(A) is stored in a ROM table or logic array. Due to the limited size of the ROM table, values sin(A+B) and sin(A−B) are not stored. Instead, the amplitude values sin(A+B) and sin(A−B) may be obtained by linear interpolation. Both sin(A) and slope(A) are stored in a ROM table or logic array for a phase input A.

For amplitude values that are slightly larger than A, such as A+B, the value of the sine function may be interpolated as:

$$\sin(A+B)=\sin(A)+\text{slope}(A)*B \qquad (1)$$

For amplitude values that are slightly smaller than A, such as A−B, the value of the sine function may be interpolated as:

$$\sin(A-B) = \sin(A) - \text{slope}(A)*B$$

rearranging, $$\sin(A-B) = -1*[-\sin(A) + \text{slope}(A)*B] \quad (2)$$

The inventors have realized that the term inside the brackets in eqn. (2) is very similar to the right side of eqn. (1). The only difference is that sin(A) is complemented in eqn. (2). The bracketed term may be implemented by an AND array for slope(A)*B, followed by an ADD array for +/−sin(A)+slope(A)*B. A complementor may generate either sin(A) or −sin(A) as needed.

Figure 3:
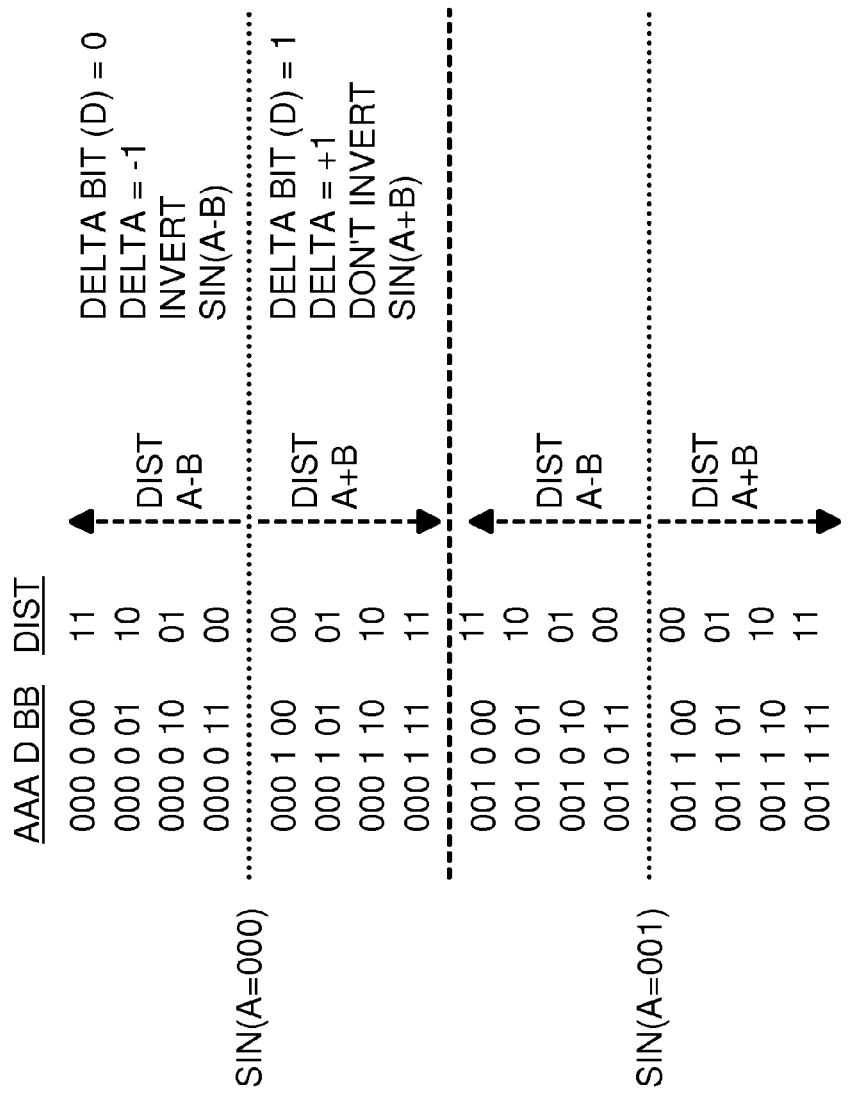
FIG. 3 is a diagram of phase input values showing phase splitting and interpolation.

FIG. 3 is a diagram of phase input values showing phase splitting and interpolation. Values of the phase input are shown as binary values. The phase input is split into three parts A, D, and B that are slightly separated in each row of FIG. 3.

The phase input is split into an upper portion A of the Most-Significant-Bits (MSBs) and a lower portion B with the Least-Significant-Bits (LSBs), with a Delta bit being an intermediate bit between A and B.

The lower portion B (the LSBs) are considered to be the distance away from the midpoint of the upper portion A, the MSBs. This distance may be positive when B is after A, or the distance may be negative when B is before A. When the distance is negative, the LSBs are considered to the one's complement of B.

For example, A,Detla,B=000,1,01 has a stored value sin(A)=sin(000) and a stored slope Slope(A). B is the distance from A, or 01. Since the Delta bit=1, this phase input is past A, or A+B.

Since the Delta bit is 1, B is not complemented and is then multiplied by the slope, or Slope(A)*(01). The value sin(A+B) is generated as sin(A)+slope(A)*B.

The sine and slope values are stored for only one midpoint value for a range of delta bit and B values. For example, sin(000) is stored for the exact value 000,1,00, which has a distance of 0, so SLOPE*B is zero. For other values of B, sin(000) is adjusted by adding SLOPE*B. Thus one value of sine, sin(000), is used for four values of B, and for two values of the Delta bit.

Distance increases as phase values move away from the midpoint value that stores sin(A). Thus 000,1,00 has a distance of zero, 000,1,01 has a distance of 1, 000,1,10 has a distance of two, and 000,1,11 has a distance of three. In the other direction, when B is before A, 000,0,11 has a distance of zero, 000,0,10 has a distance of 1, 000,0,10 has a distance of two, and 000,0,00 has a distance of three.

In a second example, B is before A, and the function desired is sin(A−B). A,Detla,B=000,0,01 has the same stored value sin(A)=sin(000) and a stored slope Slope(A). Since B is before A, and A−B is the phase input, the distance from A to A−B is 10, which is the complement of B (01). The distance is three, not one, since A is exactly 000,1,00. There are three steps counting backwards from the stored value of sin(000), which is at 000,1,00 to 000,0,11, then 000,0,10, and finally 000,0,01.

When the Delta bit is 0, the complement of B, B', is the distance from A, or 01. When the Delta bit is 0, this phase input is before A, or A−B.

Since the Delta bit is 0, B is complemented and is then multiplied by the slope, or Slope(A)*(10). The value sin(A−B) is generated as −1*[−sin(A)+slope(A)*B]. The overall result is also complemented.

A Delta function may be defined as either +1 or −1. When the Delta bit is 1, the Delta function is +1, but when the Delta bit is 0, Delta function is −1.

When B is after A, the Delta bit is 1 and Delta=+1. The sine function calculated is sin(A+B):

$$\sin(A+B) = \text{Delta}*[\text{Delta}*\sin(A) + \text{slope}(A)*B]$$

$$\sin(A+B) = 1*[1*\sin(A) + \text{slope}(A)*B]$$

When B is before A, the Delta bit is 0 and Delta=−1. The sine function calculated is sin(A−B):

$$\sin(A-B) = \text{Delta}*[\text{Delta}*\sin(A) + \text{slope}(A)*B], \text{ or}$$

$$\sin(A-B) = -1[-1*\sin(A) + \text{slope}(A)*B].$$

Thus the generic function for both sin(A+B) and sin(A−B) is:

$$\sin(A+B) \quad \text{or} \quad \sin(A-B) = \text{Delta}*[\text{Delta}*\sin(A) + \text{slope}(A)*B],$$

where Delta=−1 when the Delta bit is 0. Otherwise Delta=1.

Figure 4:
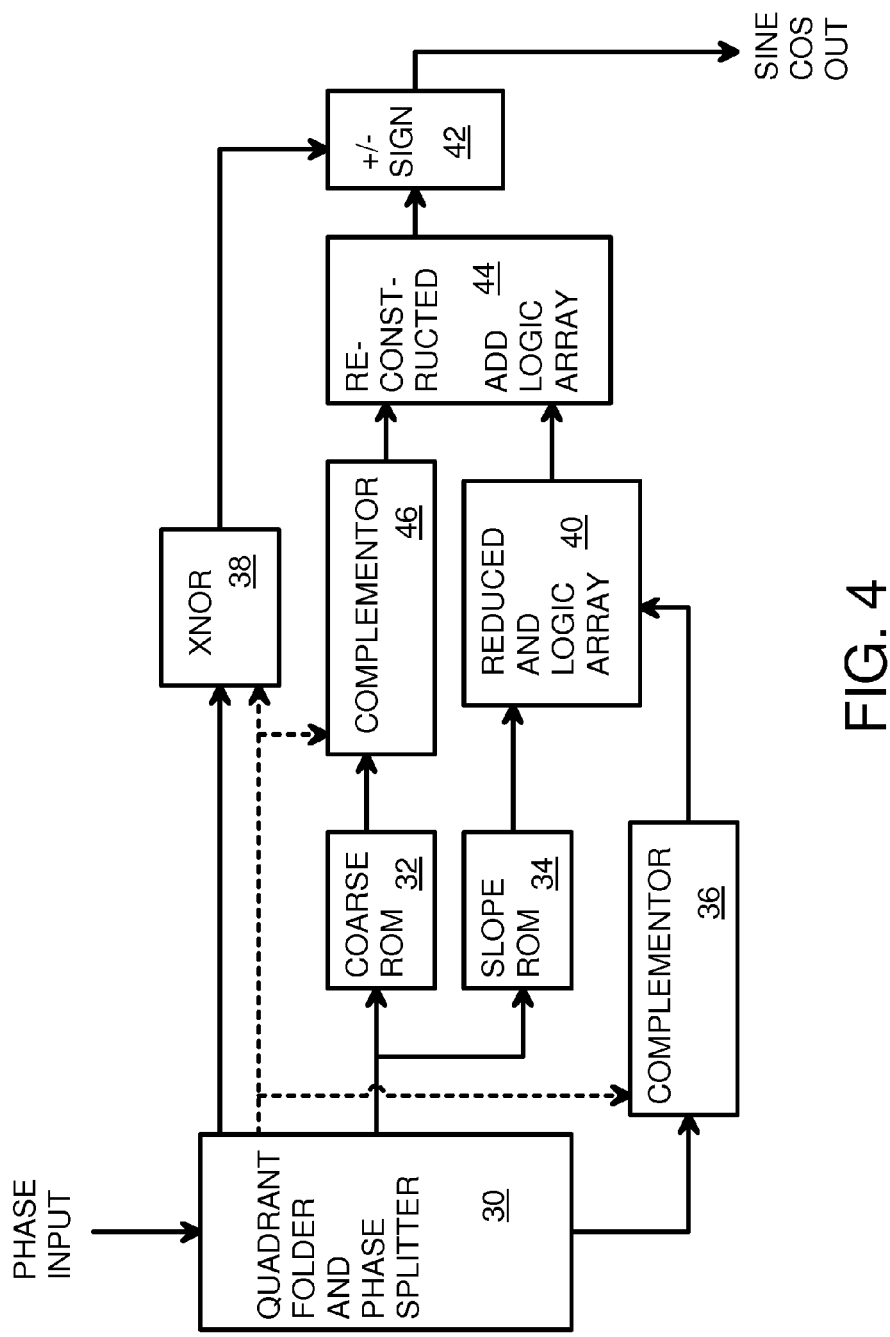
FIG. 4 is a block diagram of a sine wave generator.

FIG. 4 is a block diagram of a sine wave generator. A phase input is applied to quadrant folder and phase splitter 30. The phase input is a multi-bit digital value. Quadrant folder and phase splitter 30 sends a MSB to XNOR gate 38, which causes sign generator 42 to invert the sign of the amplitude of the final sine-wave output, depending on the quadrant of the sine wave. XNOR gate 38 also receives the intermediate Delta bit (dashed line) and inverts the MSB to adjust the final output when B is before A, when sin(A−B) is being generated.

The upper phase bits from quadrant folder and phase splitter 30 are input to coarse ROM 32 to generate the coarse sine value, sin(A). The coarse sine value is complemented by sine complementor 46 when the Delta bit is zero and sin(A−B) is being generated.

The lower phase bits from quadrant folder and phase splitter 30 are input to lower complementor 36. The intermediate bit Delta, which is between the upper and lower phase bits, controls lower complementor 36.

The upper phase bits from quadrant folder and phase splitter 30 are also input to slope ROM 34 to generate the slope at a phase value of A. This slope is applied to reduced AND logic array 40, which also receives the complemented lower phase bits from lower complementor 36. Reduced AND logic array 40 generates the multiply result of its two inputs, with the result applied to reconstructed ADD logic array 44.

The output from sine complementor 46 is also input to reconstructed ADD logic array 44. The result from reconstructed ADD logic array 44 is the absolute value of the sine wave amplitude. The sign or MSB is appended by sign generator 42 to indicate if the amplitude is positive (quadrants one and two) or negative (quadrants three and four).

Figure 5:
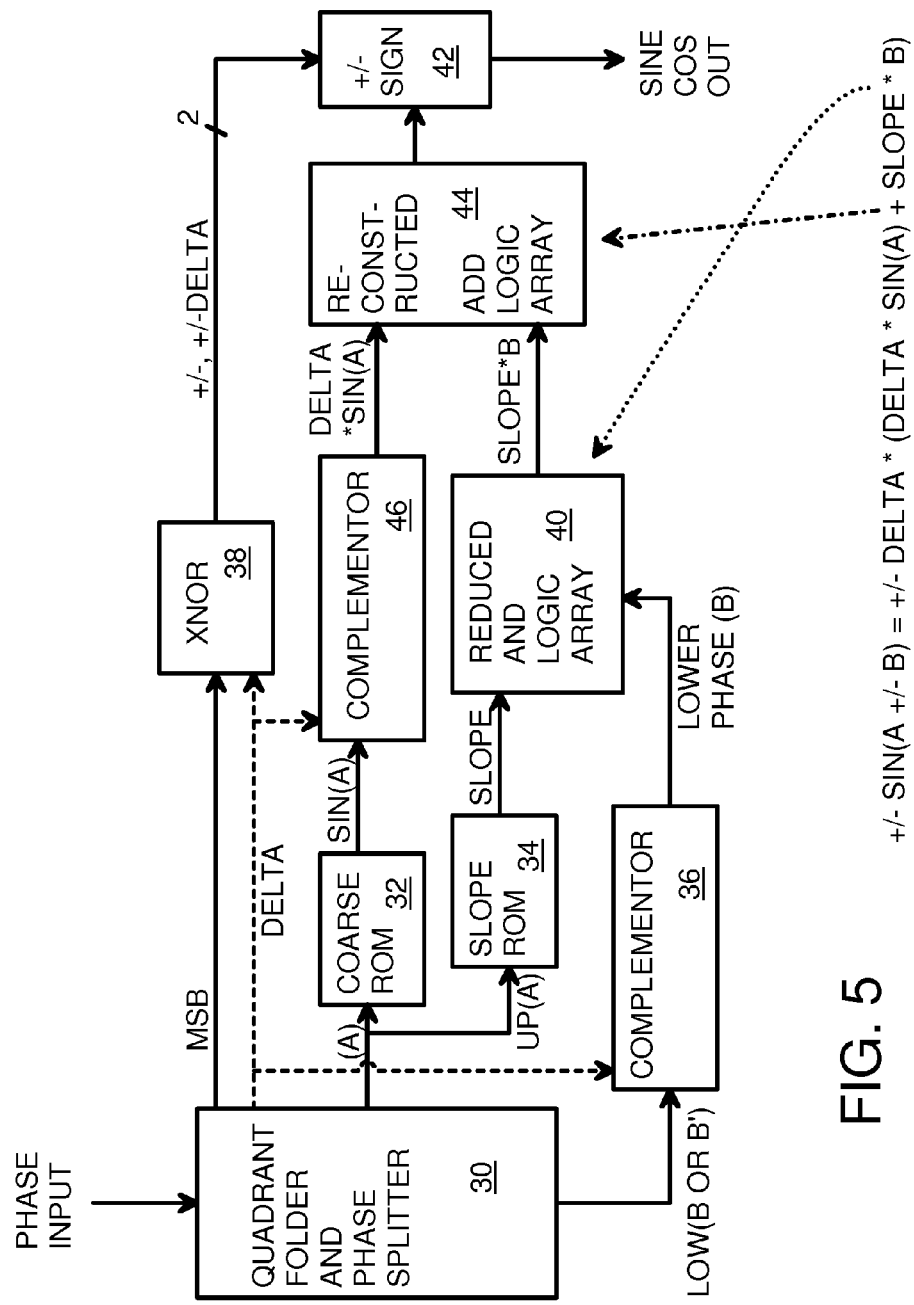
FIG. 5 is a more detailed block diagram of a sine wave generator showing intermediate values.
Figure 6:
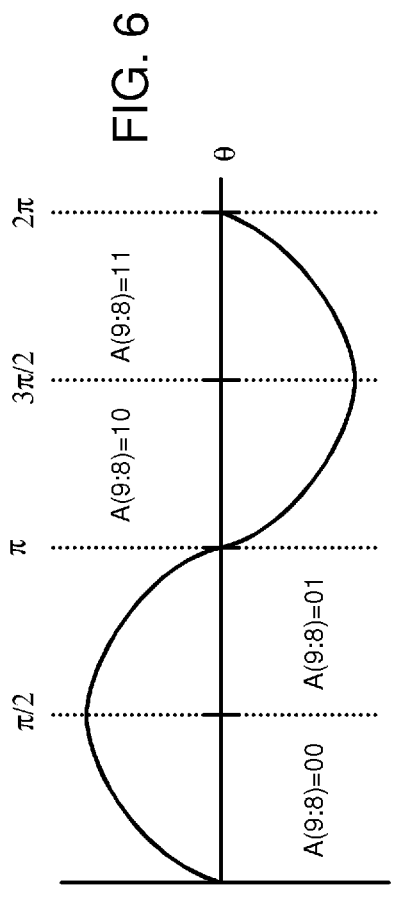
FIG. 6 is a plot of a sine wave.

FIG. 5 is a more detailed block diagram of a sine wave generator showing intermediate values. A phase input is applied to quadrant folder and phase splitter 30. The phase input is a multi-bit digital value that represents a phase or phase angle between zero and 2π. The upper two bits determine which of four quadrants of the sine wave the phase input is for, such as shown in FIG. 6. The remaining bits of the phase input are split into upper phase A, which are the MSBs, and lower phase B, which are the LSBs, and Delta, the intermediate bit between A and B.

Quadrant folder and phase splitter 30 generates A, B, and Delta from the phase input, and also inverts all the lower bits (A, Delta, B) when the upper two bits indicate the second and fourth quadrants, where the sine wave is decreasing rather than increasing. Thus the values are reflected or folded over.

The upper phase bits A are looked up in coarse ROM 32 to generate the sine wave amplitude, sin(A). The coarse sine wave amplitude occurs at the phase when the Delta bit is 1 and the lower phase bits are all zeros. Slope ROM 34 also receives upper phase bits A and generates the slope of the sine wave SLOPE for the same coarse phase, A,1,000.

The lower phase bits represent either B or B'. B' is the one's complement or bit-wise inverse of B. Lower complementor 36 inverts each lower phase bit when the Delta bit is zero, but passes the lower phase bits through unchanged when the Delta bit is one. The lower phase bits are inverted when the Delta bit is 0, since the phase value is less than the coarse phase, and sin(A−B) is being generated.

The slope from slope ROM 34 is multiplied by the lower phase B from lower complementor 36 by reduced AND logic array 40. The result is SLOPE(A)*B.

The coarse sine output sin(A) from coarse ROM 32 is conditionally complemented by sine complementor 46. Sine complementor 46 inverts each bit of sin(A) when the Delta bit is zero, but passes the sin(A) bits through unchanged when the Delta bit is one. The sin(A) bits are inverted when the Delta bit is 0, since sin(A−B) is being generated. Thus the output of sine complementor 46 is DELTA*sin(A), where DELTA is −1 when the Delta bit is 0.

Reconstructed ADD logic array 44 receives both DELTA*sin(A) from sine complementor 46, and SLOPE*B from reduced AND logic array 40. The output from reconstructed ADD logic array 44 is DELTA*sin(A)+SLOPE*B.

XNOR gate 38 receives the MSB from quadrant folder and phase splitter 30. The MSB is positive for quadrants 1 and 2, but negative for quadrants 3 and 4. When the Delta bit is 0, XNOR gate 38 inverts the MSB. The inversion by XNOR gate 38 occurs when sin(A−B) is being generated. The conditional inversion by XNOR gate 38 multiplies an additional DELTA to the final sign generated by sign generator 42. The final output by sign generator 42 is DELTA*[DELTA*sin(A)+ SLOPE*B]. XNOR gate 38 outputs two bits to sign generator 42 in this embodiment. One bits is the MSB, which is + or −, and the other bit is the XNOR of the MSB and DELTA, which is + or − DELTA.

When B is after A, then sin(A+B) is the final output from sign generator 42. The delta bit is 1 and DELTA is +1. The final output is sin(A)+SLOPE*B, or sin(A+B).

When B is before A, then sin(A−B) is the final output from sign generator 42. The delta bit is 0 and DELTA is −1. The final output is sin(A−B), or:

DELTA*[DELTA*sin(A)+SLOPE*B], or

−1*[−1*sin(A)+SLOPE*B], or sin(A)−SLOPE*B.

Thus both sin(A+B) and sin(A−B) are generated from the same circuit.

FIG. 6 is a plot of a sine wave. The sine wave has an input phase θ that varies from zero to 2π. The input phase is a multi-bit digital value. The upper two bits determine which of four quadrants of the sine wave is in. The first quadrant, A9:8=00, has the amplitude of the sine wave increasing from zero at zero phase to the maximum value at phase π/2. The second quadrant, A9:8=01, has the amplitude of the sine wave decreasing from the maximum value at phase π/2 to zero at phase π. The first two quadrants are symmetrical, so that the amplitude at phase θ in quadrant one is the same amplitude at phase θ−θ in quadrant two.

The third quadrant, A9:8=10, has the amplitude of the sine wave increasing from zero at phase π to the maximum value at phase 3π/2. The fourth quadrant, A9:8=11, has the amplitude of the sine wave decreasing from the maximum value at phase 3π/2 to zero at phase 2π. The final two quadrants are also symmetrical, so that the amplitude at phase θ in quadrant three is the same amplitude at phase 2π−θ in quadrant four. Also, the absolute value of the amplitude at phase θ in quadrants 1, 2 is the same as for quadrants 3, 4, just opposite in sign.

Thus the sine function values for a single quadrant can be folded and inverted to generate amplitudes for all four quadrants. A cosine function could also be generated by shifting the phase by π/2.

Figure 7:
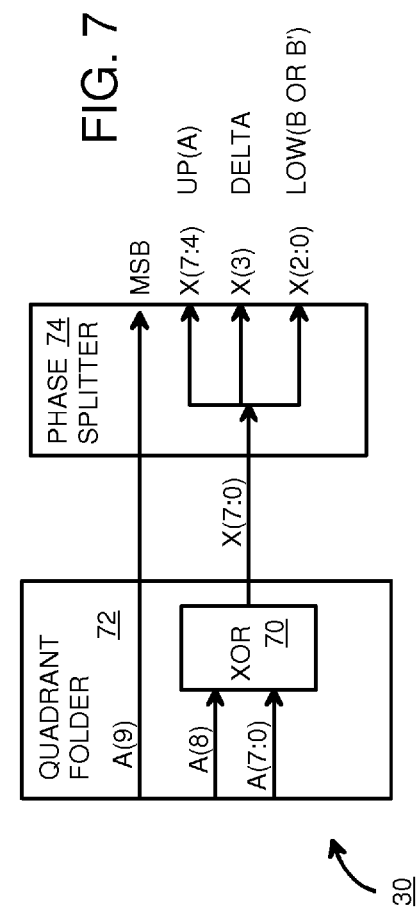
FIG. 7 is a block diagram of the quadrant folder and phase splitter.

FIG. 7 is a block diagram of the quadrant folder and phase splitter. A phase input is applied to quadrant folder and phase splitter 30. The phase input is a multi-bit digital value. The upper two bits determine which of four quadrants of the sine wave the phase input is for, such as shown in FIG. 6. The remaining bits of the phase input are split into upper phase A, the MSBs, and lower phase B, the LSBs, and Delta, the intermediate bit between A and B.

The MSB, A(9), is zero for quadrants 1 and 2, when the sine wave is positive, and one (negative) for quadrants 3 and 3, when the sine wave is negative.

Quadrant folder 72 uses the penultimate MSB, A(8), to cause XOR gate 70 to invert A7:0, the lower bits (A, Delta, B) when the upper two bits indicate the second and fourth quadrants, where the sine wave is decreasing rather than increasing. Thus one quadrant of sine wave values is folded or inverted to generate amplitudes for all four quadrants.

Phase splitter 74 receives the XOR'ed phase bits X7:0 from XOR gate 70. Phase splitter 74 generates A, B, and Delta from the X7:0 phase input by separating the bits into three groups, A, B, and Delta. In this example, Delta is X3, separating upper phase bits A (X7:4) and lower phase bits B'X2:0. The lower bits represent the bit-wise inverse of B, or B', since sin(A) is stored for Delta=1 and B=0. Thus sin(A) is stored for A,1,000, not for A,0,000.

FIG. 8 is a graph of the spectral performance of the sine wave generator. The signal strength of the output of the sine wave generator is highest at a fundamental frequency F0. The signal strength is lower for other frequencies of operation, but is higher at spur frequency F1. The difference in signal strength between fundamental 15 and spur 17 is the Spur-Free Dynamic Range (SFDR). A larger SFDR is important for better high-speed performance of a DDS.

Larger spurs often occur at harmonics of the fundamental frequency, especially the second and third order harmonics. A sine wave generator with an ideal ROM has good SFDR performance. The sine wave generator described herein has a smaller ROM size while maintaining very good SFDR performance.

Alternative Embodiments

Several other embodiments are contemplated by the inventors. For example, while a binary phase code has been described, the sine wave generator could be a hybrid system with a binary code for the MSBs, and a gray code or other code for the LSBs. Rather than have the phase input or amplitude output as binary values, gray code, thermometer code, or other encodings could be used.

While reduced AND logic array 40 could be a full multiplier, since not all combinations of input values are possible since the output is restricted to a sine wave rather than an arbitrary function, logic gates may be reduced by implementing logic only for the possible combinations of input values that yield valid output values Likewise, reconstructed ADD logic array 44 could be a full adder, but the logic gate count may be reduced by only implementing logic for the possible input values. A logic array with these possible values is thus a reduced ADD or AND function rather than a full function.

Reduced AND logic array 40 and reconstructed ADD logic array 44 can be programmable logic arrays that are programmed by a metal mask, electrically-erasable programmable read-only memory, (EEPROM), laser-blown fuses, metal fuses, RAM cells, or other programmable components. Reduced AND logic array 40 and reconstructed ADD logic array 44 may also be implemented as logic gates, either in an array or in a random layout, or as ROMs. Coarse ROM 32 and slope ROM 34 may also be programmable, or may be hard-wired, and may be regular or random in physical layout. Coarse ROM 32 and slope ROM 34 could be combined into a single ROM or table that outputs two values per entry, the sine and the slope.

Entries in a ROM table that are nearly equal, or equal within a few percent, could be combined into a single ROM entry that is accessed for several values of the phase input. Other information could be stored with the ROM entry, such as checksums or management information, or values for other functions.

While sign generator 42 has been shown as receiving the output from reconstructed ADD logic array 44, sign generator 42 could simply be the MSB generated from XNOR gate 38, which is pre-pended to the remaining bits from reconstructed ADD logic array 44.

While sin(A) and slope(A) have been described as being stored for the exact midpoint of a range of values of B, another midpoint or an endpoint of the range could also be selected. While both positive and negative distances and values of B have been described, B could always be a positive number or could always be a negative number. While two values of B both having a distance of zero have been shown, distances or their meanings could be adjusted, such as by shifting by a half of the LSB, so that distances are not symmetric or duplicated.

While a sine function has been described, other functions could also be generated. For example, rather than storing sine values and slopes in the ROMs, an arbitrary function could be stored. While linear interpolation has been described, non-linear interpolation could also be substituted. Phase and amplitude values could be scaled such as by a multiplier rather than be normalized.

While a 10-bit phase input has been shown with the Delta bit being the fourth bit, another intermediate bit could be selected for the Delta bit. Also, a phase input with more than 10 bits, or with less than 10 bits, could be chosen. The definition of the delta function could be inverted, or the encoding of the delta bit could be altered.

While an application for a sine weave generator in a DDS has been described, the circuit may be used for other applications and systems, such as for Global-Positioning Systems (GPS), Radio-Frequency Identification (RFID) readers, cable modems, Radio-Frequency (RF) base stations, transmitters, and receivers. Rather than generate sine waves, cosine waves could be generated by shifting the output phase. Other kinds of waveforms could be generated, such as triangle waves.

The MSB and Delta determine the +/− Delta of the output signal, so XNOR gate 38 and sign generator 42 can be integrated together. These may also integrated into the reduced adder logic to directly output sine waves. Other blocks or functions similarly may be combined.

The number of bits N in the synthesizer and DAC array may be adjusted. Power-down or other control circuits may be added.

The phase bits input or amplitude output bits could be merged with other control or timing information, such as from control logic or a sequencer, or a multi-phase non-overlapping clock, or a power-down signal.

Some embodiments may not use all components. For example, switches may be added or deleted in some embodiments. Different kinds of switches may be used, such as 2-way switches or 3-way switches. Muxes may be used as switches. Input or output resistors could be added, or input filters used. Multiple levels of switches may be used, such as 2-way switches for switches, and then an overall switch that connects either VDD or GND to these 2-way switches.

Inversions may be added by swapping inverting and non-inverting inputs or outputs as desired, but do not change the overall function and thus may be considered equivalents.

Capacitors, resistors, and other filter elements may be added. Switches could be n-channel transistors, p-channel transistors, or transmission gates with parallel n-channel and p-channel transistors, or more complex circuits, either passive or active, amplifying or non-amplifying.

Additional components may be added at various nodes, such as resistors, capacitors, inductors, transistors, extra buffering, etc., and parasitic components may also be present. Enabling and disabling the circuit could be accomplished with additional transistors or in other ways. Pass-gate transistors or transmission gates could be added for isolation.

The final sizes of transistors may be selected after circuit simulation or field testing. Metal-mask options or other programmable components may be used to select the final transistor sizes. Transistors may be connected together in parallel to create larger transistors that have the same fringing or perimeter effects across several sizes. Currents may be positive currents or negative currents that flow in an opposite direction.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A function generator comprising:
a digital input having lower bits, upper bits, a delta bit between the upper bits and the lower bits, and a Most-Significant-Bit (MSB);
a coarse lookup table, receiving the upper bits, for outputting a coarse function value;
a slope lookup table, receiving the upper bits, for outputting a slope;
a lower complementor for inverting the lower bits when the delta bit is in a first state, the lower complementor outputting conditionally inverted lower bits;
a first logic array that multiplies the conditionally inverted lower bits and the slope to generate a multiplied slope;
an coarse complementor for inverting the coarse function value from the coarse lookup table when the delta bit is in the first state, the coarse complementor outputting a conditionally inverted coarse function value;
a second logic array that adds the conditionally inverted coarse function value to the multiplied slope to generate a base function output; and
a polarity reverser, receiving the MSB from the digital input, for inverting the MSB when the delta bit is in the first state, the polarity reverser outputting a sign bit that is attached to the base function output to generate a function value output,
whereby the function value output is generated by conditional inversion, table lookups, and logic arrays.

2. The function generator of claim 1 further comprising:
a quadrant folder that receives the MSB and a second MSB, and inverts the upper bits, the delta bit, and the lower bits in response to the second MSB.

3. The function generator of claim 2 wherein the function value output is a wave function.

4. The function generator of claim 3 wherein the function value output is a sine wave
function that represents sin(A+B) when the delta bit is not in the first state, and
that represents sin(A−B) when the delta bit is in the first state, wherein A are the upper bits and B are the lower bits.

5. The function generator of claim 4 wherein the first logic array is a reduced AND logic array and the second logic array is a reconstructed ADD logic array.

6. The function generator of claim 4 wherein the lower bits comprise at least two bits;
wherein the upper bits comprise at least four bits having higher significances than the lower bits and the delta bit.

7. The function generator of claim 4 further comprising:
a phase accumulator coupled between a phase control input and the digital input to the function generator, the phase accumulator for accumulating the phase control input to generate the digital input.

8. The function generator of claim 7 further comprising:
a Digital-to-Analog Converter (DAC), receiving the function value output, for generating an analog voltage corresponding to the function value output.

9. The function generator of claim 8 further comprising:
a Direct Digital Synthesizer (DDS) that uses the function generator to generate the function value output as a synthesized wave.

10. The function generator of claim 1 wherein the slope output by the slope lookup table is a slope of a tangent line at a point on a function curve having the coarse function value from the coarse lookup table.

11. The function generator of claim 10 wherein the delta bit indicates a direction of interpolation along the tangent line from the coarse function value to the function value output.

12. The function generator of claim 1 wherein the coarse lookup table is a read-only memory (ROM) and the slope lookup table is a ROM.

13. A digital wave synthesizer comprising:
a phase input;
a quadrant folder and phase splitter, receiving the phase input, for outputting a Most-Significant-Bit (MSB), and for splitting the phase input into a lower phase having Least-Significant-Bits (LSBs), an upper phase having a higher significance than the lower phase, and a delta bit between the upper phase and the lower phase;
a quadrant reflector for conditionally inverting the upper phase, the delta bit, and the lower phase in response to a penultimate MSB from the phase input;
a coarse table for outputting a coarse value stored for a current value of the upper phase from the quadrant reflector;
a slope table for outputting a slope value stored for the current value of the upper phase from the quadrant reflector;
a lower inverter for inverting the lower phase when the delta bit is in a first state to generate a conditionally inverted lower phase;
an upper inverter for inverting the coarse value when the delta bit is in the first state to generate a conditionally inverted coarse value;
first logic for combining the slope value from the slope table with the conditionally inverted lower phase from the upper inverter to generate a slope-phase value;
second logic for combining the conditionally inverted coarse value from the upper inverter with the slope-phase value from the first logic to generate a wave amplitude; and
a sign inverter, receiving the MSB from the quadrant folder, for inverting the MSB to generate a sign bit when the delta bit is in the first state, wherein the sign bit indicates a polarity of the wave amplitude.

14. The digital wave synthesizer of claim 13 wherein the coarse table stores a plurality of entries selectable by the upper phase, each entry storing a coarse value of a wave function;
wherein the slope table stores a plurality of entries selectable by the upper phase, each entry storing a slope of a tangent line to a curve of the wave function.

15. The digital wave synthesizer of claim 14 wherein the coarse table and the slope table are stored in a read-only memory (ROM) on a semiconductor substrate.

16. The digital wave synthesizer of claim 14 wherein the wave function is a sine wave function.

17. The digital wave synthesizer of claim 16 wherein the wave amplitude and the sign bit for a current value of the phase input represent an approximation of sin(A+B) when the delta bit is not in the first state, and sin(A−B) when the delta bit is in the first state,
wherein A is the upper phase and B is the lower phase and each are multi-bit binary values, whereby both sin(A+B) and sin(A−B) are generated, depending on the delta bit between the upper phase and the lower phase.

18. A wave generator comprising:
quadrant means for inverting lower bits, a delta bit, and upper bits in response to a second bit;
sign means for inverting a first bit in response to the delta bit to generate a sign bit;
lower inverter means for inverting the lower bits in response to the delta bit;
lookup means for generating a coarse value and a slope value for a value of the lower bits received from the quadrant means;
coarse inverter means for inverting the coarse value in response to the delta bit;
first logic means for generating product bits that represent a value of the slope value multiplied by the lower bits from the lower inverter means;
second logic means for generating amplitude bits that represent a sum of the product bits and the coarse value from the coarse inverter means;
wherein the sign bit indicates a polarity of the amplitude bits; and
output means for outputting the sign bit and the amplitude bits as a wave function result.

19. The wave generator of claim 18 wherein the lookup means stores entries for all possible values of the upper bits independent of values of the lower bits.

20. The wave generator of claim 19 wherein the first logic means comprises a logic array performing a multiply operation;
wherein the second logic means comprises a logic array performing an addition operation.

21. The wave generator of claim 18 wherein the lookup means further comprises entries representing function values of a sine wave function in a first quadrant and representing slope values of a tangent line to a curve of the sine wave function for each function value.

* * * * *